(12) United States Patent
Zhang et al.

(10) Patent No.: US 11,835,431 B1
(45) Date of Patent: Dec. 5, 2023

(54) TRUE THREE-DIMENSIONAL PHYSICAL SIMULATION SYSTEM FOR INFLUENCE OF FAULT MOVEMENT ON TUNNEL OPERATION AND TEST METHOD

(71) Applicant: SHANDONG UNIVERSITY, Shandong (CN)

(72) Inventors: Qiangyong Zhang, Jinan (CN); Ruixin Zhang, Jinan (CN); Weizhong Chen, Jinan (CN); Kang Duan, Jinan (CN); Wen Xiang, Jinan (CN); Hanxiang Lin, Jinan (CN); Lei Cheng, Jinan (CN); Pengfei Wang, Jinan (CN)

(73) Assignee: SHANDONG UNIVERSITY

( * ) Notice: Subject to any disclaimer, the term of this patent is extended or adjusted under 35 U.S.C. 154(b) by 0 days.

(21) Appl. No.: 17/785,179

(22) PCT Filed: May 28, 2021

(86) PCT No.: PCT/CN2021/096866
§ 371 (c)(1),
(2) Date: Jun. 14, 2022

(87) PCT Pub. No.: WO2022/241816
PCT Pub. Date: Nov. 24, 2022

(30) Foreign Application Priority Data

May 19, 2021 (CN) .......................... 202110546814.5

(51) Int. Cl.
*G01M 99/00* (2011.01)
*G09B 25/04* (2006.01)

(52) U.S. Cl.
CPC ........... *G01M 99/008* (2013.01); *G09B 25/04* (2013.01)

(58) Field of Classification Search
CPC ... G01N 2203/0019; G01N 2203/0042; G01N 2203/0044; G01N 2203/0048; G01N 3/12;
(Continued)

(56) References Cited

U.S. PATENT DOCUMENTS

2019/0078987 A1   3/2019   Zhang et al.

FOREIGN PATENT DOCUMENTS

| CN | 101285808 A | 10/2008 |
| CN | 104809947 A | 7/2015 |

(Continued)

OTHER PUBLICATIONS

Feb. 16, 2022 International Search Report issued in International Patent Application No. PCT/CN2021/096866.
(Continued)

*Primary Examiner* — Herbert K Roberts
*Assistant Examiner* — Anthony W Megna Fuentes
(74) *Attorney, Agent, or Firm* — Oliff PLC

(57) ABSTRACT

A true three-dimensional physical simulation system for the influence of fault movement on tunnel operation and a test method, including a fault movement rack system, a fault movement jacking system, and a loading and movement control system. The fault movement rack system accommodates a movement model and serves as a loading reaction device. The fault movement jacking system implements fault movement and ensures that the model is not twisted and overturned in a fault movement process. The loading and movement control system performs initial ground stress loading on the model and controls the fault movement jacking system to implement fault movement of the model. Fault movement of a deep stratum under a complex high ground stress condition can be simulated, the influence of underground fault movement on safe and stable operation of
(Continued)

a deep tunnel is simulated, and a powerful technical support is provided for safe construction of deep engineering.

12 Claims, 6 Drawing Sheets

(58) Field of Classification Search
CPC ......... G01N 3/02; G01N 33/24; G01M 5/005; G01M 99/008; G09B 25/00; G09B 25/04
See application file for complete search history.

(56) References Cited

FOREIGN PATENT DOCUMENTS

| | | | |
|---|---|---|---|
| CN | 205317963 U | 6/2016 | |
| CN | 106198191 A | 12/2016 | |
| CN | 106226808 A | 12/2016 | |
| CN | 206540677 U | 10/2017 | |
| CN | 108333054 A * | 7/2018 | ............... G01N 3/06 |
| CN | 108982219 A | 12/2018 | |
| CN | 109377849 A | 2/2019 | |
| CN | 109470839 A | 3/2019 | |
| CN | 109754697 A | 5/2019 | |
| CN | 109839315 A | 6/2019 | |
| CN | 110006757 A | 7/2019 | |
| CN | 110006758 A * | 7/2019 | ............... G01N 3/02 |
| CN | 110780056 A | 2/2020 | |
| CN | 111158067 A | 5/2020 | |
| CN | 112116861 A | 12/2020 | |
| CN | 112504790 A | 3/2021 | |
| JP | H04-327693 A | 11/1992 | |

OTHER PUBLICATIONS

Feb. 16, 2022 Written Opinion issued in International Patent Application No. PCT/CN2021/096866.

De-xue Ji et al. "Development and Application of Physical Model Test Device Showing Evolution Process of the Reverse Fault". Journal of Xi'an University of Science and Technology, Mar. 31, 2013, Issue 2, vol. 33, part 2, figures 1,2.

Wen Fan et al. "Research on Physical Model Experiment of Metro Tunnel Crossing Ground Fissure Belt". Chinese Journal of Rock Mechanics and Engineering, 2008, vol. 27, No. 9, pp. 1917-1923.

Xuezeng Liu et al. "Effect of Thrust Fault Stick-Slip Rupture on Road Tunnel". Journal of Tongji University, 2012, vol. 40, No. 7, pp. 1008-1014.

Ren, Mingyang, "Study on Mechanism of Collaborative Bearing Effect of Rock-Support System in Deep Tunnel Construction", A Dissertation Submitted for the Doctoral Degree of Philosophy, pp. 145-179, Jan. 15, 2021.

Dec. 9, 2021 Office Action issued in Chinese Application No. 202110546814.5.

* cited by examiner

TRUE THREE-DIMENSIONAL PHYSICAL SIMULATION SYSTEM FOR INFLUENCE OF FAULT MOVEMENT ON TUNNEL OPERATION AND TEST METHOD

TECHNICAL FIELD

The present invention relates to a true three-dimensional physical simulation system for the influence of fault movement on tunnel operation and a test method used in the field of hydropower, transportation, energy, and mine engineering.

BACKGROUND

With the rapid development of social economy, China has developed into a country with the largest construction number, largest scale and most diverse structural forms of tunnel and underground engineering in the world. In recent years, with the vigorous development of China transportation and hydropower construction, the focus of construction has gradually shifted to the western regions where geological conditions are more complex. However, the frequent earthquakes, high seismic intensity and complex geological structure in the western regions easily lead to the slip movement of underground active faults, thus having a very adverse influence on the operation safety of deep transportation and hydropower tunnels. Therefore, it is necessary to study the influence of complex fault movement on safe and stable tunnel operation. Traditional theoretical methods are difficult to be applied to deep engineering, numerical simulation is difficult, field in-situ test conditions are limited, and the tests are expensive. In contrast, physical simulation tests with the characteristics of vividness, intuitiveness and reality become an important means to study deep engineering. In order to carry out physical simulation tests of the influence of underground fault movement on safe tunnel operation, it is necessary to provide a corresponding physical simulation test system.

The study status of a physical simulation test system for fault movement is as follows: In the patent No. CN 201510200464.1, entitled "Inflatable Strike-Slip Fault Movement Simulation Device and Simulation Experiment Method", a simulation device is disclosed. The simulation device can simulate fault movement under the action of gravity, without considering the influence of initial structural ground stress. The device is inconsistent with actual engineering geological conditions, and cannot simulate the influence of fault movement on safe and stable tunnel operation under real true three-dimensional initial ground stress environment conditions.

In the patent No. CN 201620006494.9, entitled "Breakdown Test Device for Simulating Tunnel Crossing Oblique Moving Active Fault", a simulation device is disclosed. The simulation device simulates tunnel breakdown under stress by plane loading, without considering the influence of true three-dimensional initial ground stress. The device is inconsistent with actual engineering geological conditions, and cannot simulate the influence of fault movement on safe and stable tunnel operation under real true three-dimensional initial ground stress environment conditions.

In the patent No. CN 201720049666.5, entitled "Test Box Device for Testing Stick-Slip Movement of Normal Fault of Tunnel", a test box device is disclosed. The device includes a simulation test box and a jack, and can simulate an anti-seismic and shock-absorbing effect of a fault zone in a high earthquake region. However, a model test device is likely to laterally rotate in a fault movement process, and cannot simulate the influence of fault movement on safe and stable tunnel operation under real true three-dimensional initial ground stress environment conditions.

In the patent No. CN 201810860128.3, entitled "Tunnel Fault Movement Model Test Device and Movement Model Test System", a model test system is disclosed. The model test system consists of an outer box, an inner box, a loading device, and a measuring device. A thrust is exerted on the inner box to simulate fault movement, and a stress deformation law of a tunnel under a fault movement state is obtained. However, the influence of a fault in a dipping structure cannot be considered, and the influence of fault movement on safe and stable tunnel operation under real true three-dimensional initial ground stress environment conditions cannot be simulated.

In the patent No. CN 201910049175.4, entitled "Three-Dimensional Similar Physical Test Device for Simulating Fault Movement", a test device is disclosed. The device is provided with a rectangular box body made of a transparent acrylic plate serving as a loading reaction device to simulate shallow-buried fault movement. However, the device is not rigid enough to simulate the influence of deep faults. It cannot simulate the influence of fault movement on safe and stable tunnel operation under real true three-dimensional initial ground stress environment conditions.

In the patent No. CN 201911125822.1, entitled "Test Device for Simulating Study on Damage Mechanism of Active Fault to Tunnel and Usage Method", a test device is disclosed. The device can simulate the influence of fault movement on tunnel damage under the action of gravity, without considering the influence of initial structural ground stress. The device is inconsistent with actual engineering geological conditions. It cannot simulate the influence of fault movement on safe and stable tunnel operation under real true three-dimensional initial ground stress environment conditions.

In the paper "*Research on Physical Model Experiment of Metro Tunnel Crossing Ground Fissure Belt*" of "*Chinese Journal of Rock Mechanics and Engineering*", Issue 9, 2008, a test device was introduced. The device can simulate the influence of ground fracture movement on tunnel, without considering the influence of true three-dimensional initial ground stress. The device is inconsistent with actual engineering geological conditions, and cannot simulate the influence of fault movement on safe and stable tunnel operation under true three-dimensional initial ground stress environment conditions.

In the paper "*Effect of Thrust Fault Stick—slip Rupture on Road Tunnel*" of "*Journal of Tongji University*", Issue 7, 2012, a model test device was introduced. The device consists of a fixed disk, a movable disk, and a loading system. It can simulate the influence of different dip faults on tunnel stability, without considering the influence of true three-dimensional initial ground stress. The device is inconsistent with actual engineering geological conditions, and cannot simulate the influence of fault movement on safe and stable tunnel operation under real true three-dimensional initial ground stress environment conditions.

SUMMARY

In view of the deficiencies of the prior art, an object of the present invention is to provide a true three-dimensional physical simulation system for the influence of fault movement on tunnel operation and a test method.

The present invention is implemented by using the following technical solutions to achieve the foregoing objectives.

An embodiment of the present invention provides a true three-dimensional physical simulation system for the influence of fault movement on tunnel operation, including: a fault movement rack system, a fault movement jacking system, and a loading and movement control system. The fault movement rack system consists of a fault hanging wall system, a fault footwall system, loading actuators, and a rack rotating device. Any one of the fault hanging wall system and the fault footwall system is connected to the fault movement jacking system. The fault movement jacking system is configured to realize relative slip of the fault hanging wall system and the fault footwall system and then implement fault movement of a test model. The rack rotating device is configured to drive the fault hanging wall system and the fault footwall system to rotate. The loading actuators are installed on the fault hanging wall system and the fault footwall system, and are connected to the loading and movement control system for exerting true three-dimensional initial ground stress on the test model. The loading and movement control system controls loading of the loading actuators, rotation of the fault hanging wall and footwall systems, and fault slip movement.

In a second aspect, the present invention also provides a test method based on the true three-dimensional physical simulation system for the influence of fault movement on tunnel operation. The method includes the following steps:

After the installation and commissioning of the true three-dimensional physical simulation system, firstly controlling, by the loading and movement control system, the loading actuators to perform true three-dimensional initial ground stress loading on a test model; excavating a tunnel and keeping an initial ground stress constant upon formation of a true three-dimensional initial ground stress field of the model; and finally controlling, by the loading and movement control system, the fault movement jacking system to implement slip movement of a model fault, thus effectively simulating the influence of underground fault movement on safe and stable tunnel operation.

Beneficial Effects of the Embodiments of the Present Invention are as Follows (1) The present invention, as a whole, can realize the slip movement of underground faults under true three-dimensional initial ground stress environment conditions, truly simulate the influence of complex geological environments on safe and stable construction and operation of deep tunnels, and scientifically reveal the influence of underground fault movement of different scales and occurrences on the long-term safe operation of tunnels.

(2) In the present invention, in order to reduce the space size of a fault movement rack system, a loading actuator is externally embedded on the fault movement rack system. Meanwhile, in order to facilitate the manufacture of a test model containing a dip fault, a rack rotating device is provided on the fault movement rack system. The production of the test model containing the dip fault is realized by rotating a fault hanging wall system and a fault footwall system.

(3) A fault movement anti-twisting device of the present invention is configured to ensure that the fault hanging wall system and the fault footwall system are closely fitted without separation in a fault movement process and ensure continuous and stable loading of horizontal ground stress. The fault movement anti-twisting device is installed between the fault hanging wall system and an outer frame balancing device. When a fault movement jacking system pushes the fault hanging wall system to generate a slip movement, an anti-twisting oil cylinder and anti-twisting springs installed in spring sleeves also move up vertically synchronously along a vertical guide rail fixed on the outer frame balancing device. Meanwhile, the anti-twisting oil cylinder drives the anti-twisting springs to continuously exert a horizontal elastic resistance on the fault hanging wall system, so as to ensure that the fault hanging wall system and the fault footwall system are closely fitted without opening and separating, thereby preventing any offset and twisting phenomenon of the model in the process of fault slip movement.

(4) The outer frame balancing device of the present invention serves as a reaction device for model loading in the process of fault slip movement and prevents the fault movement rack system from being overturned.

(5) The present invention has a wide application prospect in physical simulation tests of underground engineering such as transportation, hydropower, mine, and energy, especially Sichuan-Tibet railway and western deeply-buried long tunnel diversion tunnel engineering.

BRIEF DESCRIPTION OF THE DRAWINGS

The accompanying drawings constituting a part of the present invention are used to provide a further understanding of the present invention. Exemplary embodiments of the present invention and descriptions thereof are used to explain the present invention, and do not constitute an improper limitation of the present invention.

Figure 1:
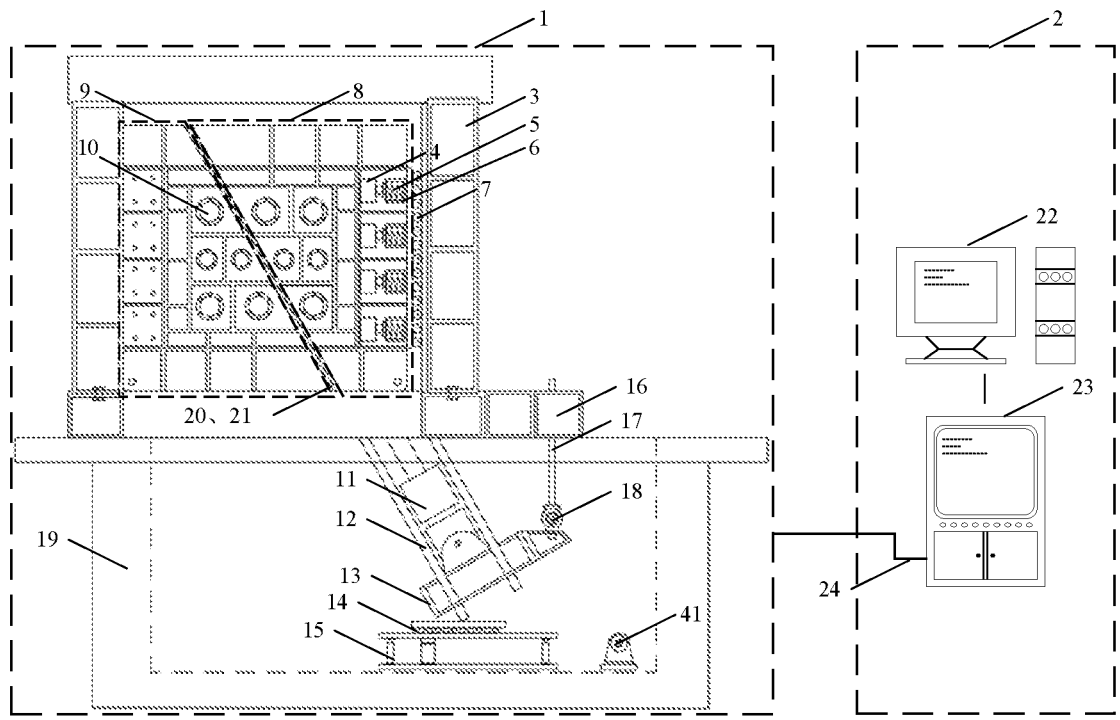
FIG. 1 is an overall structure diagram of a system according to the present invention.

In the figures: the spacing or size of various parts is exaggerated to show the location of each part, and the diagrams are used for illustration only.

In the figures: 1, model test rack system; 2, loading and movement control system; 3, outer frame balancing device; 4, anti-twisting oil cylinder; 5, anti-twisting spring; 6, spring sleeve; 7, vertical guide rail; 8, fault hanging wall system; 9, fault footwall system; 10, loading actuator; 11, jacking actuator; 12, guide rod; 13, reaction plate; 14, dip adjuster; 15, supporting table; 16, ground beam; 17, lifting rod; 18, lifting lug; 19, geosyncline; 20, slip guide tenon; 21, slip guide mortise; 22, loading and movement control software system; 23, loading and movement control cabinet; 24, high-pressure pipeline; 25, top reaction wall; 26, bottom reaction wall; 27, left reaction wall; 28, right reaction wall; 29, front reaction wall; 30, rear reaction wall; 31, rotating shaft; 32-1, footwall rotating base; 32-2, hanging wall rotating base; 33, excavation window; 34, footwall model; 35, hanging wall model; 36, excavation tunnel; 37, loading limiting device; 38, footwall rotating oil cylinder; 39, footwall rotating oil cylinder anchor; 40, hanging wall rotating oil cylinder; 41, hanging wall rotating oil cylinder anchor; 42, underground fault; 43, spring fixing plate; 44, sleeve fixing plate; 45, anti-twisting fixing plate.

DETAILED DESCRIPTION

It should be noted that the following detailed descriptions are all exemplary and are intended to provide a further description of the present invention. Unless otherwise specified, all technical and scientific terms used in the present invention have the same meanings as those usually understood by a person of ordinary skill in the art to which the present disclosure belongs.

It should be noted that the terms used herein are merely used for describing specific implementations, and are not intended to limit exemplary implementations of the present invention. As used herein, the singular form is also intended to include the plural form unless the present invention clearly dictates otherwise. In addition, it should further be understood that, terms "comprise" and/or "include" used in this specification indicate that there are features, steps, operations, devices, components, and/or combinations thereof.

For convenience of description, the terms "upper", "lower", "left", "right", "front", and "rear" only indicate upper, lower, left, right, front, and rear directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present invention.

As described in the background art, there are deficiencies in the prior art. In order to solve the above technical problems, the present invention provides a true three-dimensional physical simulation system for the influence of fault movement on tunnel operation and a test method.

In a typical implementation of the present invention, as shown in FIG. 1, the true three-dimensional physical simulation system for the influence of fault movement on tunnel operation provided in this embodiment mainly consists of a model test rack system 1 and a loading and movement control system 2. The model test rack system 1 consists of a fault movement rack system and a fault movement jacking system. The fault movement jacking system is configured to drive two structures of the fault movement rack system to perform relative slip movement. The loading and movement control system 2 mainly includes a loading and movement control software system 22, a loading and movement control cabinet 23, and a high-pressure pipeline 24, etc. The loading and movement control system 2 controls the fault movement jacking system, a loading actuator 10, and a jacking actuator 11 by means of the high-pressure pipeline 24.

As shown in FIGS. 2-7, the fault movement rack system is mainly configured to accommodate a movement model and serves as a loading reaction device. The fault movement rack system mainly consists of a fault hanging wall system 8, a fault footwall system 9, a loading actuator 10, and a rack rotating device. The loading actuator 10 is configured to exert initial ground stress on the fault hanging wall system 8 and the fault footwall system 9. The rack rotating device is configured to drive the fault hanging wall system 8 and the fault footwall system 9 to rotate.

Figure 3:
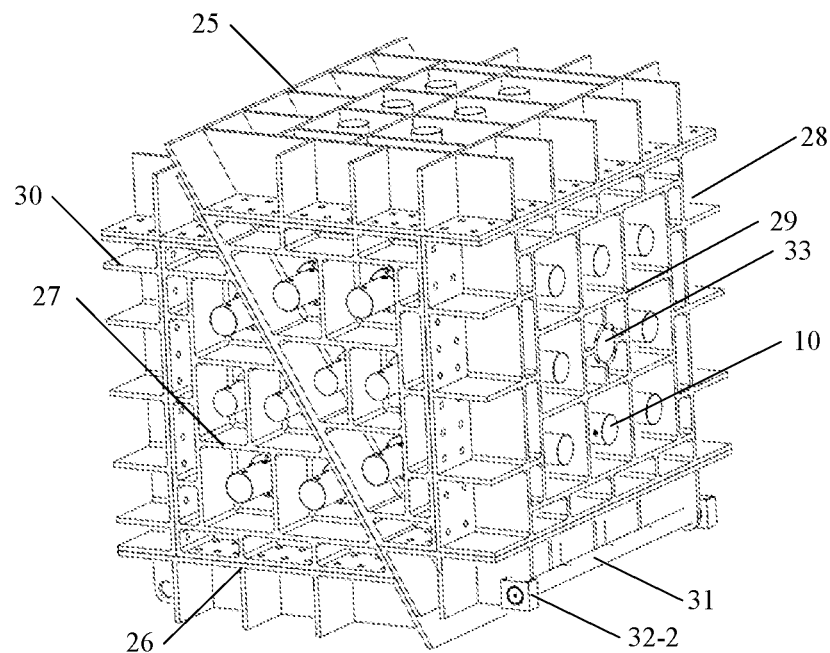
FIG. 3 is a three-dimensional diagram of a fault movement rack system according to the present invention.
Figure 4:
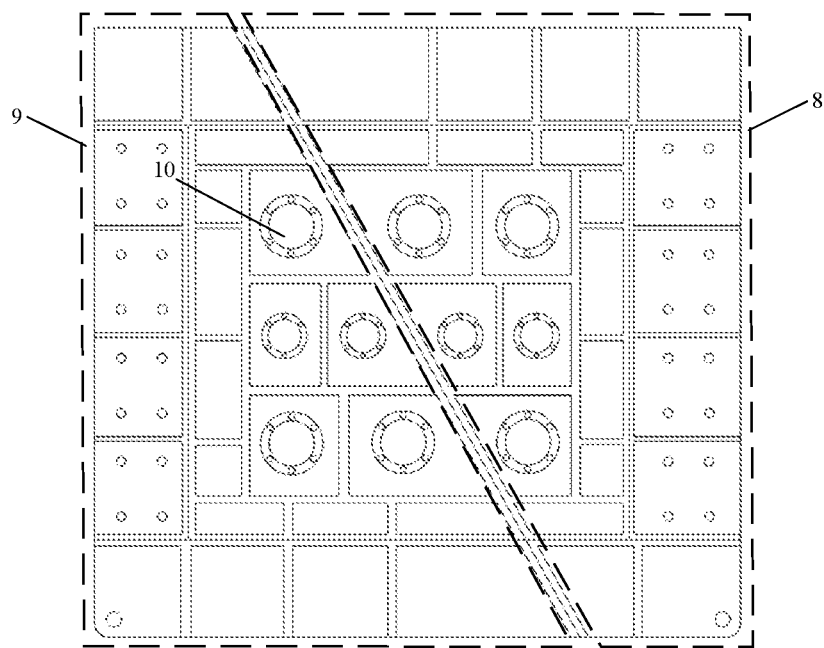
FIG. 4 is a side view of a fault movement rack system according to the present invention.
Figure 5:
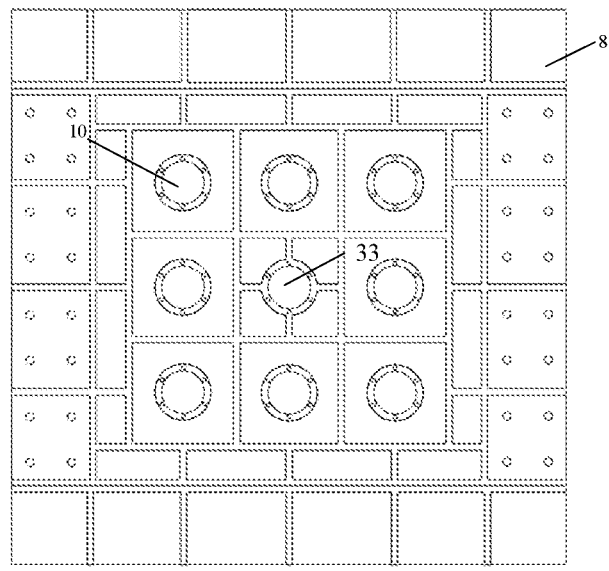
FIG. 5 is a front view of a fault movement rack system according to the present invention.
Figure 6:
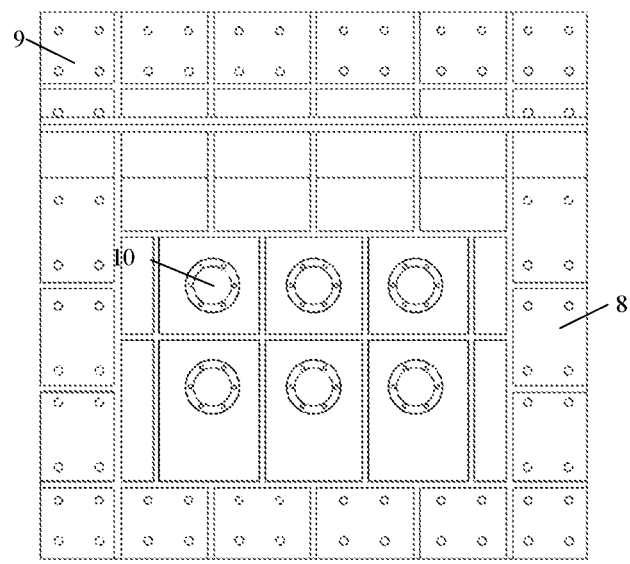
FIG. 6 is a top view of a fault movement rack system according to the present invention.
Figure 7:
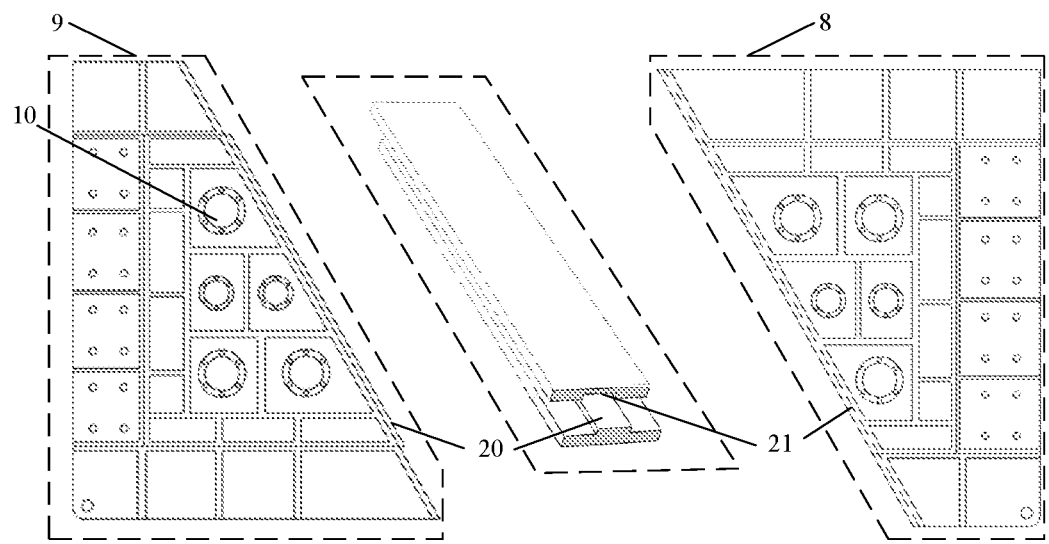
FIG. 7 is a diagram of a mortise and tenon inlaying structure of a fault movement rack system according to the present invention.

As shown in FIGS. 3 and 7, the fault hanging wall system 8 and the fault footwall system 9 have basically the same structure. The fault hanging wall system 8 is formed by connecting and combining a top reaction wall 25, a front reaction wall 29, a left reaction wall 27, and a right reaction wall 28 by means of high-strength bolts. The fault footwall system 9 is formed by connecting and combining a bottom reaction wall 26, a rear reaction wall 30, the left reaction wall 27, and the right reaction wall 28 by means of high-strength bolts. The fault hanging wall system 8 and the fault footwall system 9 have a trapezoidal vertical section. The fault hanging wall system 8 and the fault footwall system 9 are combined together to form a rectangle. Each steel reaction wall module is manufactured by welding a high-quality high-strength Q345B steel plate with a thickness of 30 mm.

Further, in order to prevent the fault movement rack system from laterally shifting in a fault movement process, the fault hanging wall system 8 and the fault footwall system 9 are inlaid and connected at a fault contact surface by means of a mortise and tenon structure (including a slip guide tenon 20 and a slip guide mortise 21). With particular reference to FIG. 7, in this embodiment, the slip guide tenon 20 is provided on a slip surface of the fault footwall system 9, the slip guide mortise 21 is provided on the fault hanging wall system 8, and the slip guide tenon 20 and the slip guide mortise 21 are fitted with each other. Of course, as will be readily understood, the provision positions thereof are exchangeable. The slip guide mortise 21 is provided on the slip surface of the fault footwall system 9, the slip guide tenon is provided on the fault hanging wall system 8, and the slip guide tenon and the slip guide mortise are fitted with each other. The fault movement rack system can also be prevented from laterally shifting as well.

As shown in FIGS. 2-7, in order to reduce the space size of the fault movement rack system, the loading actuator 10 is embedded on the fault movement rack system. A total of 48 loading actuators 10 with a design loading tonnage of 450 kN are embedded on the reaction walls of the fault movement rack system. The fault hanging wall system 8 and the fault footwall system 9 are provided with 24 loading actuators 10 separately. The loading actuators have a stroke of 150 mm. The loading actuators 10 are connected to the loading and movement control system 2 by means of the high-pressure oil pipe 24. Before and during the upward slip movement of the fault hanging wall system 8 along a fault 42, a test model is subjected to non-uniform loading and voltage stabilization control of high ground stress by means of eight independent oil channels provided in the loading and movement control system 2.

Figure 8:
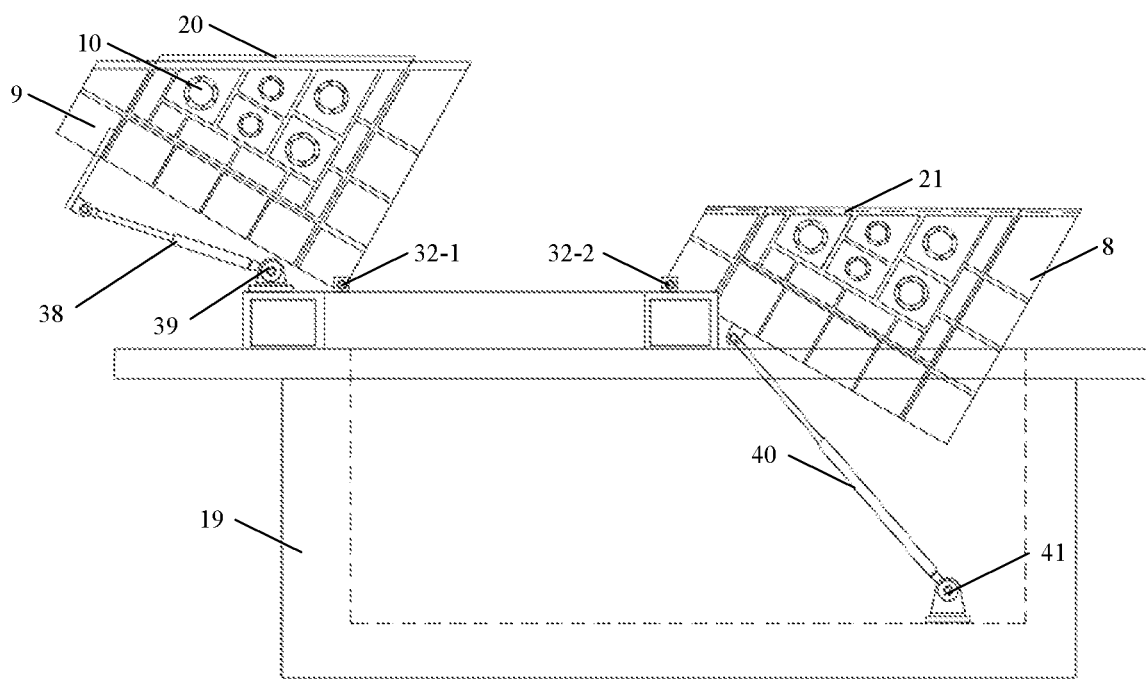
FIG. 8 is a diagram of a rack rotating device according to the present invention.

As shown in FIGS. 3 and 8, in order to facilitate the manufacture of a test model containing a dip fault 42, the fault movement rack system is provided with two rack rotating devices. The first rack rotating device drives the fault footwall system 9 to rotate. The second rack rotating device drives the fault hanging wall system 8 to rotate.

The rack rotating device for driving the fault footwall system 9 includes a footwall rotating oil cylinder 38, a footwall rotating oil cylinder anchor 39, and a footwall rotating base 32-1, which are located on the left side in FIG. 8. The footwall rotating oil cylinder anchor 39 is fixed on a ground beam 16. A cylinder body of the footwall rotating oil cylinder 38 is hinged to the footwall rotating oil cylinder anchor 39. A driving rod of the footwall rotating oil cylinder 38 is hinged to the fault footwall system 9. A foot of the fault footwall system 9 is connected to the ground beam 16 by means of a rotating shaft and the footwall rotating base 32-1. It should be noted that the foot is a right-angled portion on the left side of a lower end of the fault footwall system 9.

The rack rotating device for driving the fault hanging wall system 8 includes a hanging wall rotating oil cylinder 40, a hanging wall rotating oil cylinder anchor 41, and a hanging wall rotating base 32-2, which are located on the right side in FIG. 8. The hanging wall rotating oil cylinder anchor 41 is fixed on a geosyncline 19. A cylinder body of the hanging wall rotating oil cylinder 40 is hinged to the hanging wall rotating oil cylinder anchor 41. A driving rod of the hanging wall rotating oil cylinder 40 is hinged to the fault hanging wall system 8. A foot of the fault hanging wall system 8 is connected to the rotating base 32-2 fixed on the ground beam by means of a rotating shaft 31. It should be noted that the foot is a right-angled portion on the right side of a lower end of the fault hanging wall system 8.

The specific working process of the rack rotating device is as follows: When filling, the hanging wall rotating oil cylinder 40 and the footwall rotating oil cylinder 38 are driven. Firstly, the fault hanging wall system 8 and the fault footwall system 9 are rotated to a horizontal state. Then, the rack devices of the fault hanging wall system 8 and the fault footwall system 9 are respectively filled with compaction model materials. Finally, the hanging wall rotating oil cylinder 40 and the footwall rotating oil cylinder 38 are then adjusted to integrate the fault hanging wall system 8 and the fault footwall system 9, so as to form a test model containing a dip fault 42.

Figure 2:
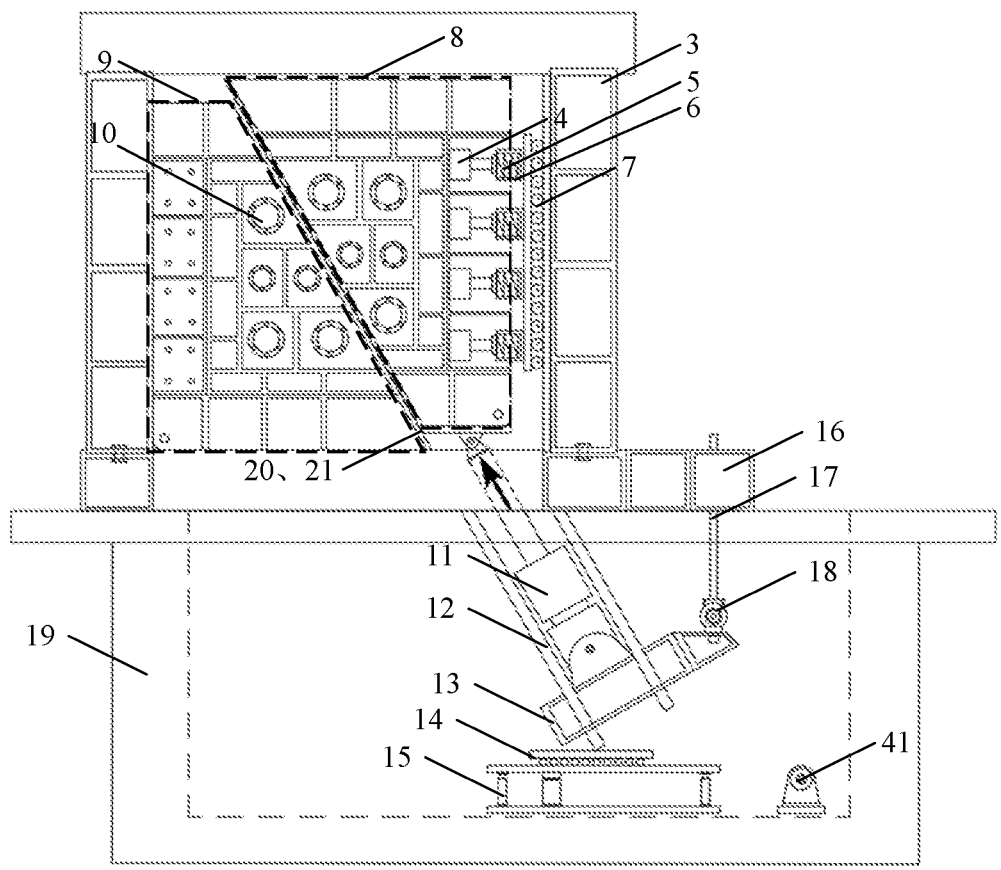
FIG. 2 is a diagram of a fault movement jacking system according to the present invention.
Figure 9:
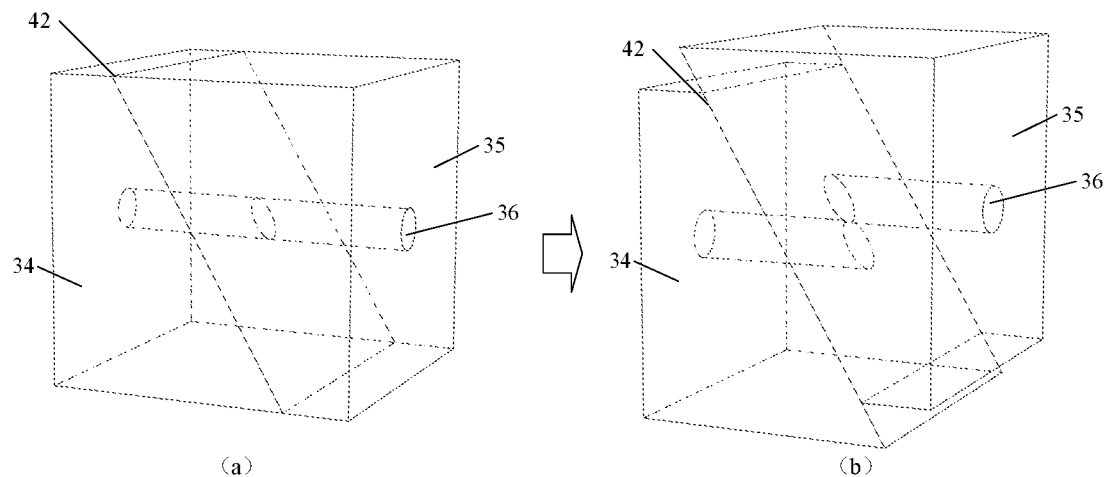
FIG. 9 is a diagram of model fault movement according to the present invention.

As shown in FIGS. 2 and 9, the fault movement jacking system is mainly configured to implement slip movement of the fault hanging wall system 8 along the fault 42. The fault movement jacking system mainly consists of a hydraulic jacking device, a fault movement anti-twisting device, an outer frame balancing device 3, etc. The hydraulic jacking device is connected to the bottom of the fault hanging wall system 8, and drives the fault hanging wall system 8 and the fault footwall system 9 to slip relatively. Both ends of the fault movement anti-twisting device are respectively connected to the side of the fault hanging wall system 8 and the outer frame balancing device 3. The structure of this portion is described in detail below:

As shown in FIG. 1, the above hydraulic jacking device is installed in the geosyncline 19, and mainly consists of a jacking actuator 11, a guide rod 12, a reaction plate 13, a dip adjuster 14, and a support table 15. The support table 15 is horizontally installed in the geosyncline. The dip adjuster 14 is installed on the top of the support table 15. The reaction plate 13 is installed on the dip adjuster 14. The reaction plate is fixed obliquely. The jacking actuator 11 is fixed on the reaction plate 13 by means of the guide rod 12. The jacking actuator 11 is connected to the fault hanging wall system 8. It should be noted that the axis of the jacking actuator 11 is parallel to the fault contact surface between the fault hanging wall system 8 and the fault footwall system 9. After the jacking actuator 11 is adjusted to an angle required for the test by means of the dip adjuster 14 provided on the support table 15, the jacking actuator 11 is fixed to the front reaction wall 29 of the fault hanging wall system 8 by means of the guide rod 12. In order to ensure the stability of the hydraulic jacking device, a lifting lug 18 and a pull rod 17 are installed at the tail of the reaction plate 13 connected to the guide rod 12, and the pull rod 17 is fixed on the ground beam 16 at the upper part of the geosyncline 19. Thus, the safety and stability of the hydraulic jacking device during implementation of fault slip movement can be completely ensured. The thrust of the jacking actuator is 2000 kN, the stroke is 150 mm, the displacement loading rate is 0.1-10 mm/min, and the fault vertical offset is less than or equal to 120 mm.

Figure 10:
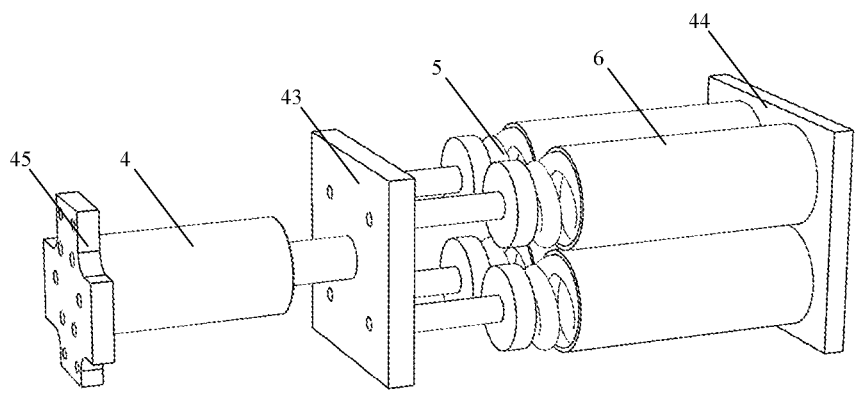
FIG. 10 is a diagram of a fault movement anti-twisting device according to the present invention.

As shown in FIGS. 2 and 10, the above fault movement anti-twisting device is configured to ensure that the fault hanging wall system 8 and the fault footwall system 9 are closely fitted without separation in a fault movement process, and to ensure continuous and stable loading of horizontal ground stress. As shown in FIG. 2, in this embodiment, a total of eight sets of fault movement anti-twisting devices are installed on the front reaction wall 29 of the fault hanging wall system 8. Each fault movement anti-twisting device consists of an anti-twisting oil cylinder 4 with a design tonnage of 450 kN, four anti-twisting springs 5 installed in spring sleeves 6, a spring fixing plate 43, and a sleeve fixing plate 44. A rear end of the anti-twisting oil cylinder 4 is connected to the front reaction wall 29 by means of an anti-twisting fixing plate 45. A front end of the anti-twisting oil cylinder 4 is connected to the anti-twisting spring 5 installed in the spring sleeve 6 by means of the spring fixing plate 43. One end of the anti-twisting spring 5 is installed on the spring fixing plate 43. The other end is connected to a vertical guide rail 7 fixed on the outer frame balancing device 3 by means of the sleeve fixing plate 44. A total of 32 anti-twisting springs 5 and 32 spring sleeves 6 are provided in the model fault movement anti-twisting device.

As shown in FIG. 2, when the jacking actuator 11 of the fault movement jacking system pushes the fault hanging wall system 8 to perform upward slip movement along a fault plane 42, the anti-twisting oil cylinder 4 and the anti-twisting spring 5 of the fault movement anti-twisting device also move up vertically synchronously along the vertical guide rail 7. Meanwhile, the anti-twisting oil cylinder 4 drives the anti-twisting spring 5 to continuously exert a horizontal elastic resistance on the fault hanging wall system 8, so as to ensure that the fault hanging wall system 8 and the fault footwall system 9 are not opened and separated in the fault slip movement process.

Figure 11:
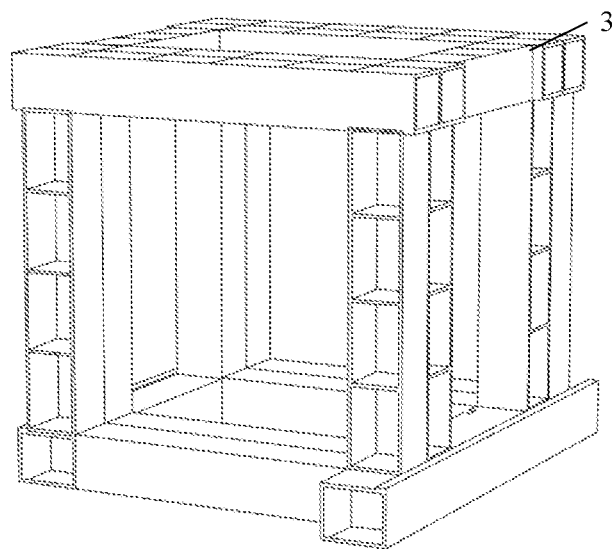
FIG. 11 is a three-dimensional diagram of an outer frame balancing device according to the present invention.

As shown in FIGS. 2 and 11, in order to continuously load the horizontal ground stress of the model in the fault movement process and ensure that the fault movement rack system is not overturned, an outer frame balancing device 3 is provided outside the fault movement rack system. In this embodiment, the outer frame balancing device 3 is formed by connecting and combining upright posts with a sectional size of 500 mm×500 mm and a cross beam connecting the upright posts by means of high-strength bolts. The vertical guide rail 7 is installed on an inner side face of the outer frame balancing device 3. A ball is embedded at the bottom of the sleeve fixing plate 44, and the ball is capable of rolling along the vertical guide rail 7. Then, the sleeve fixing plate 44 is capable of slipping up and down along the vertical guide rail 7 under the action of an external force.

Figure 12:
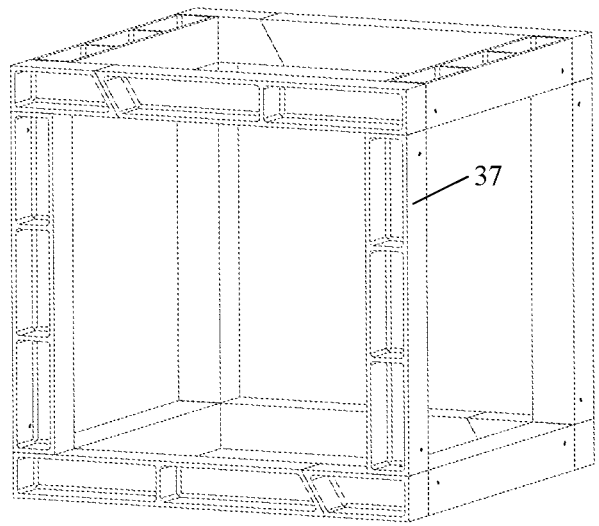
FIG. 12 is a diagram of a loading limiting device according to the present invention.

As shown in FIGS. 2 and 12, in order to avoid mutual interference between loading plates in various directions in a true three-dimensional loading process of a model test, a loading limiting device 37 is provided inside the fault movement rack system. The loading limiting device 37 is a hollowed-out stereo device formed by combining high-strength steel beams by means of high-strength bolts.

As shown in FIGS. 1 and 2, after the installation and commissioning of the true three-dimensional physical simulation test system, the loading and movement control system 2 firstly controls the loading actuators 10 to perform true three-dimensional initial ground stress loading on a test model. A model tunnel 36 is excavated and initial ground stress is kept constant upon formation of a true three-dimensional initial ground stress field of a model. Then, the loading and movement control system 2 controls the fault movement jacking system to implement slip movement of a model fault 42, thus effectively simulating influence of underground fault movement on safe and stable tunnel operation.

The foregoing descriptions are merely preferred embodiments of the present invention and are not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A true three-dimensional physical simulation system for the influence of fault movement on tunnel operation, comprising: a fault movement rack system, a fault movement jacking system, and a loading and movement control system, the fault movement rack system consisting of a fault hanging wall system, a fault footwall system, loading actuators, and a rack rotating device, wherein any one of the fault hanging wall system and the fault footwall system is connected to the fault movement jacking system, and the fault movement jacking system is configured to realize relative slip of the fault hanging wall system and the fault footwall system and implement fault movement of a test model;

the fault movement jacking system comprises a fault movement anti-twisting device, an outer frame balancing device, and a hydraulic jacking device; the hydraulic jacking device is connected to the fault hanging wall system or the fault footwall system, one end of the fault movement anti-twisting device is connected to the fault hanging wall system or the fault footwall system, and the other end is connected to the outer frame balancing device; the fault movement anti-twisting device comprises an anti-twisting oil cylinder, anti-twisting springs, spring sleeves, a spring fixing plate, and a sleeve fixing plate; one end of the anti-twisting oil cylinder is connected to the fault hanging wall system or the fault footwall system, and the other end is connected to the spring fixing plate; the spring fixing plate and the sleeve fixing plate are connected by means of the plurality of anti-twisting springs, each anti-twisting spring is externally sleeved with one spring sleeve, and the spring sleeves are fixed on the sleeve fixing plate;

the outer frame balancing device is formed by connecting and combining four upright posts installed at four corners of the outer side of the fault movement rack system and a cross beam connecting the upright posts by means of bolts; an inner side face of the outer frame balancing device is vertically provided with a guide rail, and the sleeve fixing plate is capable of freely slipping along the guide rail under the action of an external force;

the rack rotating device is configured to drive the fault hanging wall system and the fault footwall system to rotate; the loading actuators are installed on the fault hanging wall system and the fault footwall system, and are connected to the loading and movement control system for exerting true three-dimensional initial ground stress on the test model; and the loading and movement control system controls loading of the loading actuators, rotation of the fault hanging wall and footwall systems, and fault slip movement.

2. The true three-dimensional physical simulation system for the influence of fault movement on tunnel operation according to claim 1, wherein the fault hanging wall system and the fault footwall system are connected at a fault contact surface by means of a mortise and tenon inlaying structure.

3. A test method of the true three-dimensional physical simulation system for the influence of fault movement on tunnel operation according to claim 2, comprising: after the installation and commissioning of the true three-dimensional physical simulation system, firstly controlling, by the loading and movement control system, the loading actuators to perform true three-dimensional initial ground stress loading on the test model; excavating a model tunnel and keeping an initial ground stress constant upon formation of a true three-dimensional initial ground stress field of a model; and finally controlling, by the loading and movement control system, the fault movement jacking system to implement slip movement of a model fault under true three-dimensional stress conditions.

4. The true three-dimensional physical simulation system for the influence of fault movement on tunnel operation according to claim 1, wherein the rack rotating device comprises a first rack rotating device and a second rack rotating device, the first rack rotating device drives the fault footwall system to rotate, and the second rack rotating device drives the fault hanging wall system to rotate.

5. The true three-dimensional physical simulation system for the influence of fault movement on tunnel operation according to claim 4, wherein the first rack rotating device comprises a first installation seat and a first hydraulic driving device, the first installation seat is fixed on a ground beam, a cylinder body of the first hydraulic driving device is hinged to the first installation seat, a hydraulic driving rod of the first hydraulic driving device is connected to the fault footwall system, and the bottom of the fault footwall system is hinged to the ground beam.

6. A test method of the true three-dimensional physical simulation system for the influence of fault movement on tunnel operation according to claim 5, comprising: after the installation and commissioning of the true three-dimensional physical simulation system, firstly controlling, by the loading and movement control system, the loading actuators to perform true three-dimensional initial ground stress loading on the test model; excavating a model tunnel and keeping an initial ground stress constant upon formation of a true three-dimensional initial ground stress field of a model; and finally controlling, by the loading and movement control system, the fault movement jacking system to implement slip movement of a model fault under true three-dimensional stress conditions.

7. The true three-dimensional physical simulation system for the influence of fault movement on tunnel operation according to claim 4, wherein the second rack rotating device comprises a second installation seat and a second hydraulic driving device, the second installation seat is fixed in a geosyncline, a cylinder body of the second hydraulic driving device is hinged to the second installation seat, a hydraulic driving rod of the second hydraulic driving device is connected to the fault hanging wall system, the bottom of the fault hanging wall system is hinged to a ground beam, and the ground beam is installed on the top of the geosyncline.

8. A test method of the true three-dimensional physical simulation system for the influence of fault movement on tunnel operation according to claim 7, comprising: after the installation and commissioning of the true three-dimensional physical simulation system, firstly controlling, by the loading and movement control system, the loading actuators to perform true three-dimensional initial ground stress loading on the test model; excavating a model tunnel and keeping an initial ground stress constant upon formation of a true three-dimensional initial ground stress field of a model; and finally controlling, by the loading and movement control system, the fault movement jacking system to implement slip movement of a model fault under true three-dimensional stress conditions.

9. A test method of the true three-dimensional physical simulation system for the influence of fault movement on tunnel operation according to claim 4, comprising: after the installation and commissioning of the true three-dimensional physical simulation system, firstly controlling, by the loading and movement control system, the loading actuators to perform true three-dimensional initial ground stress loading on the test model; excavating a model tunnel and keeping an initial ground stress constant upon formation of a true three-dimensional initial ground stress field of a model; and finally controlling, by the loading and movement control system, the fault movement jacking system to implement slip movement of a model fault under true three-dimensional stress conditions.

10. The true three-dimensional physical simulation system for the influence of fault movement on tunnel operation according to claim 1, wherein the hydraulic jacking device comprises a jacking actuator and a guide rod, and the axis of the jacking actuator is controlled by the guide rod and is parallel to the fault contact surface between the fault hanging wall system and the fault footwall system.

11. A test method of the true three-dimensional physical simulation system for the influence of fault movement on tunnel operation according to claim 10, comprising: after the installation and commissioning of the true three-dimensional physical simulation system, firstly controlling, by the loading and movement control system, the loading actuators to perform true three-dimensional initial ground stress loading on the test model; excavating a model tunnel and keeping an initial ground stress constant upon formation of a true three-dimensional initial ground stress field of a model; and finally controlling, by the loading and movement control system, the fault movement jacking system to implement slip movement of a model fault under true three-dimensional stress conditions.

12. A test method of the true three-dimensional physical simulation system for the influence of fault movement on tunnel operation according to claim 1, comprising: after the installation and commissioning of the true three-dimensional physical simulation system, firstly controlling, by the loading and movement control system, the loading actuators to perform true three-dimensional initial ground stress loading on the test model; excavating a model tunnel and keeping an initial ground stress constant upon formation of a true three-dimensional initial ground stress field of a model; and finally controlling, by the loading and movement control system, the fault movement jacking system to implement slip movement of a model fault under true three-dimensional stress conditions.

* * * * *